(12) United States Patent
Ma et al.

(10) Patent No.: US 11,887,321 B2
(45) Date of Patent: Jan. 30, 2024

(54) THREE-DIMENSIONAL SCANNING IMAGE ACQUISITION AND PROCESSING METHODS AND APPARATUSES, AND THREE-DIMENSIONAL SCANNING DEVICE

(71) Applicant: Shining3D Tech Co., Ltd., Zhejiang (CN)

(72) Inventors: Chao Ma, Zhejiang (CN); Xiaobo Zhao, Zhejiang (CN); Xiaojun Chen, Zhejiang (CN)

(73) Assignee: Shining3D Tech Co., Ltd., Zhejiang (CN)

( * ) Notice: Subject to any disclaimer, the term of this patent is extended or adjusted under 35 U.S.C. 154(b) by 214 days.

(21) Appl. No.: 17/265,509

(22) PCT Filed: Aug. 15, 2019

(86) PCT No.: PCT/CN2019/100799
§ 371 (c)(1),
(2) Date: Feb. 2, 2021

(87) PCT Pub. No.: WO2020/038277
PCT Pub. Date: Feb. 27, 2020

(65) Prior Publication Data
US 2021/0295545 A1    Sep. 23, 2021

(30) Foreign Application Priority Data
Aug. 21, 2018    (CN) .......................... 201810954837.8

(51) Int. Cl.
*G06T 7/521*    (2017.01)
*G06T 7/33*    (2017.01)
(Continued)

(52) U.S. Cl.
CPC .............. *G06T 7/521* (2017.01); *G01B 11/25* (2013.01); *G06T 7/248* (2017.01); *G06T 7/33* (2017.01);
(Continued)

(58) Field of Classification Search
None
See application file for complete search history.

(56) References Cited

U.S. PATENT DOCUMENTS

| 4,917,487 A | 4/1990 | Crui Ckshank |
| 2010/0328308 A1 | 12/2010 | Gamliel et al. |

(Continued)

FOREIGN PATENT DOCUMENTS

| CN | 103196393 A | 7/2013 |
| CN | 105333838 A | 2/2016 |

(Continued)

OTHER PUBLICATIONS

Sakashita Kazuhiro et al. "Capturing textured 3D Shapes based on Infrared One-shot Grid Pattern". IPSJ Transactions on Computer Vision and Applications. vol. 4, No. 0, Oct. 2012 (Oct. 2012). pp. 161-169, XP055825552.

(Continued)

*Primary Examiner* — James A Thompson
(74) *Attorney, Agent, or Firm* — Gang Yu

(57) ABSTRACT

The present disclosure provides three-dimensional scanning image acquisition and processing methods and apparatuses, and a three-dimensional scanning device. The three-dimensional scanning image processing method includes: synchronously acquiring a projection pattern of first wavelength light and an illumination image of second wavelength light projected on a measured object, and acquiring a color texture image projecting the measured object. Through the present disclosure, a problem of texture misalignment caused by the (Continued)

time difference and position difference between the three-dimensional reconstruction data and the color texture image in related art is solved.

9 Claims, 7 Drawing Sheets

(51) Int. Cl.
| | |
|---|---|
| G06T 7/246 | (2017.01) |
| G01B 11/25 | (2006.01) |
| G06T 7/40 | (2017.01) |
| G06T 15/04 | (2011.01) |
| G06T 15/50 | (2011.01) |
| H04N 25/71 | (2023.01) |

(52) U.S. Cl.
CPC ............... *G06T 7/40* (2013.01); *G06T 15/04* (2013.01); *G06T 15/506* (2013.01); *G06T 2207/10024* (2013.01); *G06T 2207/10028* (2013.01); *G06T 2207/10152* (2013.01); *G06T 2207/30036* (2013.01); *H04N 25/71* (2023.01)

(56) References Cited

U.S. PATENT DOCUMENTS

| | | |
|---|---|---|
| 2015/0256813 A1 | 9/2015 | Dal Mutto et al. |
| 2016/0223319 A1 | 8/2016 | Munro et al. |
| 2019/0254529 A1* | 8/2019 | Pesach ................. A61B 5/0064 |
| 2020/0129069 A1* | 4/2020 | Inglese ................ A61B 5/1077 |

FOREIGN PATENT DOCUMENTS

| | | |
|---|---|---|
| CN | 106289092 A | 1/2017 |
| CN | 106934394 A | 7/2017 |
| CN | 107105217 A | 8/2017 |
| CN | 107131848 A | 9/2017 |
| CN | 107202554 A | 9/2017 |
| CN | 107633165 A | 1/2018 |
| CN | 207198919 U | 4/2018 |
| CN | 108053435 A | 5/2018 |
| CN | 207369209 U | 5/2018 |
| CN | 109584352 A | 4/2019 |
| WO | 2018073824 A1 | 4/2018 |

OTHER PUBLICATIONS

Search report of corresponding EP application No. 19851007.5.
Ku, Zhiqin et al. "Algorithm and implement of Scanning BIG 3D Objects". Journal of Test and Measurement Technology. Dec. 31, 2002 (Dec. 31, 2002). vol. 16.
Kiyotaka Akasaka et al. "A Sensor forSimultaneouslyCapturing Textureand Shape byProjectingStructured InfraredLight". 2007 6thInternationalConference on 3-DDigital Imaging andModeling. May 19, 2014 (May 19, 2014). vol. 16.

* cited by examiner ns321 B2

THREE-DIMENSIONAL SCANNING IMAGE ACQUISITION AND PROCESSING METHODS AND APPARATUSES, AND THREE-DIMENSIONAL SCANNING DEVICE

TECHNICAL FIELD

The present disclosure relates to the field of communication, and in particular to three-dimensional scanning image acquisition and processing methods and apparatus, and a three-dimensional scanning device.

BACKGROUND

At present, there are many dynamic three-dimensional scanners on the market, which can perform three-dimensional scanning in real time to obtain a three-dimensional shape of a surface of an object. When a texture of the object is pasted on a surface of three-dimensional data, a display effect will be improved. Therefore, it is necessary to obtain a texture image of a current view when scanning the three-dimensional data of the current view for real-time mapping. A structured light triangulation principle, which is mostly used by the dynamic three-dimensional scanners, needs to project a structured light pattern on the surface of the object to perform three-dimensional reconstruction, and the texture image is generally collected at the previous moment and position or the next moment and position of a reconstructed image, so there are a time difference and a position difference between the reconstructed image and the texture image. The existing products on the market will adopt many methods to solve this problem, such as increasing an acquisition frame rate of a camera to reduce the time difference and the position difference, or using a difference between the texture images of the previous and next frames for estimation. However, inventors found that the above existing products on the market require a higher acquisition frame rate to obtain the difference between the texture images of the previous and next frames for estimation, so the actual production cost is very high. Furthermore, there is a large error in the estimation manner, so the texture mapping accuracy will be affected.

SUMMARY

At least some embodiments of the present disclosure provide three-dimensional scanning image acquisition and processing methods and apparatuses, and a three-dimensional scanning device, so as at least to partially solve problems of very high production cost, low texture mapping accuracy, waste of a lot of time and the like in a process of reducing time difference and position difference between a reconstructed image and a texture image in three-dimensional scanning in related art.

In an embodiment of the present disclosure, a three-dimensional scanning image processing method is provided, including: synchronously acquiring a projection pattern of first wavelength light and an illumination image of second wavelength light projected on a measured object; and acquiring a color texture image projecting the measured object.

Optionally, when the same projection manner is used for projecting the measured object, the projection pattern coincides with the illumination image in position; or when different projection manners are used for projecting the measured object, a position relationship between the projection pattern and the illumination image is determined according to a position relationship between a collection device of the projection pattern and a collection device of the illumination image.

Optionally, the color texture image is acquired by triggering white light to be projected on the measured object.

Optionally, the illumination image is an image for reflecting the texture of the measured object.

Optionally, the first wavelength light and the second wavelength light are wavelength light not interfering with each other in wavelength.

In another embodiment of the present disclosure, a three-dimensional scanning image processing method is provided, including: determining an image relationship between a color texture image and an illumination image; and matching the color texture image to a projection pattern for three-dimensional reconstruction of texture mapping of data according to the image relationship. The projection pattern is acquired by projecting first wavelength light on a measured object, and the illumination image is acquired by projecting second wavelength light on the measured object in synchronization with the projection pattern; and the color texture image is acquired by the projection on the measured object.

Optionally, the image relationship between the color texture image and the illumination image is determined in at least one of the following manners: matching the color texture image with the illumination image by sift or surf feature extraction points, or processing an optical flow tracking algorithm on the color texture image and the illumination image.

Optionally, the image relationship includes at least one of: a conversion relationship between the color texture image and the illumination image, and a mapping relationship between the color texture image and the illumination image.

Optionally, the projection pattern, the illumination image and the color texture image are acquired in the following manners: inputting the projected image to at least one color Charge Coupled Device (CCD) chip; and receiving an image processed by the at least one color CCD chip.

In another embodiment of the present disclosure, a three-dimensional scanning image acquisition apparatus is provided, including: a first image acquisition module, synchronously acquiring a projection pattern of first wavelength light and an illumination image of second wavelength light projected on a measured object; and a second image acquisition module, acquiring a color texture image projecting the measured object.

In another embodiment of the present disclosure, a three-dimensional scanning image processing apparatus is provided, including: an image processing module, determining an image relationship between a color texture image and an illumination image; and a reconstruction module, matching the color texture image to a projection pattern for three-dimensional reconstruction of texture mapping of data according to the image relationship. The projection pattern is acquired by projecting first wavelength light on a measured object, and the illumination image is acquired by projecting second wavelength light on the measured object in synchronization with the projection pattern; and the color texture image is acquired by the projection on the measured object.

In another embodiment of the present disclosure, a three-dimensional scanning device is provided, including: a timing control circuit, a projection optical system, an auxiliary optical system, an illumination optical system and an image collection optical system. Each of the projection optical system, the auxiliary optical system and the illumination optical system includes a projection device configured to project light. The image collection optical system is configured to collect images projected to a measured object by the projection optical system, the auxiliary optical system and the illumination optical system. The timing control circuit is connected with the image collection optical system, the projection optical system, the auxiliary optical system and the illumination optical system, and is configured to perform timing control on the image collection optical system, the projection optical system, the auxiliary optical system and the illumination optical system.

Optionally, when the timing control circuit determines that a first moment is reached, the projection optical system is triggered to project a pattern of first wavelength light onto a measured object, the auxiliary optical system is triggered to project second wavelength light onto the measured object synchronously, and a projection pattern of the first wavelength light and an illumination image of the second wavelength light are acquired by the image collection optical system. When the timing control circuit determines that a second moment is reached, the illumination optical system is triggered to perform projection on the measured object, and a color texture image is acquired by the image collection optical system.

Optionally, the three-dimensional scanning device is connected with an image processor, or the three-dimensional scanning device includes the image processor. The image processor collects the projection pattern, the illumination image and the color texture image; determines an image relationship between the color texture image and the illumination image; and matches the color texture image to the projection pattern for three-dimensional reconstruction of texture mapping of data according to the image relationship.

Optionally, the projection device includes: a projection frame and a projection lens connected with the projection frame. The projection frame includes: a light source, located at one end in the projection frame away from the projection lens; and a light diaphragm, located in the projection frame and arranged between the light source and the projection lens. The light source and the projection lens are coaxially arranged.

Optionally, in the projection optical system, the auxiliary optical system and the illumination optical system, the projection device of the projection optical system is provided with a projection pattern mask, and the projection pattern mask is located between the light diaphragm and the projection lens.

Optionally, the projection frame further includes: a converging lens, located at one end in the projection frame away from the projection lens, and configured to converge light from the light source; and heat insulation glass, located between the light source and the light diaphragm, and configured to prevent heat generated by the light source from diffusing.

Optionally, at least one of the auxiliary optical system and the illumination optical system is a Light-Emitting Diode (LED).

Optionally, the auxiliary optical system and the illumination optical system are the same optical system.

In another embodiment of the present disclosure, a storage medium is further provided. A computer program is stored in the storage medium, and the computer program is configured to perform steps in any one of the above method embodiments when running.

In another embodiment of the present disclosure, an electronic device is further provided, including a memory and a processor. A computer program is stored in the memory, and the processor is configured to run the computer program to perform steps in any one of the above method embodiments.

Through the present disclosure, in three-dimensional reconstruction, an auxiliary light source is added at the same time and at the same position, and the projection of the auxiliary light source is used for matching a color problem image. In this way, the problem of texture misalignment caused by the time difference and position difference between the three-dimensional reconstruction data and the color texture image in related art can be solved, thereby achieving the effects of reduction of the time difference and position difference between the three-dimensional reconstruction data and the color texture image, high texture mapping accuracy, low production cost and less time waste.

BRIEF DESCRIPTION OF THE DRAWINGS

The drawings described here are used for further understanding the present disclosure and constituting a part of the present application. The schematic embodiments of the present disclosure and the description thereof are used for explaining the present disclosure, and do not constitute an improper limitation on the present disclosure. In the drawings.

DETAILED DESCRIPTION

The present disclosure will be described in detail below with reference to the drawings and in conjunction with the embodiments. It should be stated that in the case of no conflict, embodiments in the present application and features in embodiments can be mutually combined.

It should be noted that the terms "first", "second", and the like in the specification and claims of the present disclosure and the foregoing drawings are used for distinguishing similar objects and do not necessarily describe a specific sequence or order.

Embodiment One

Figure 1:
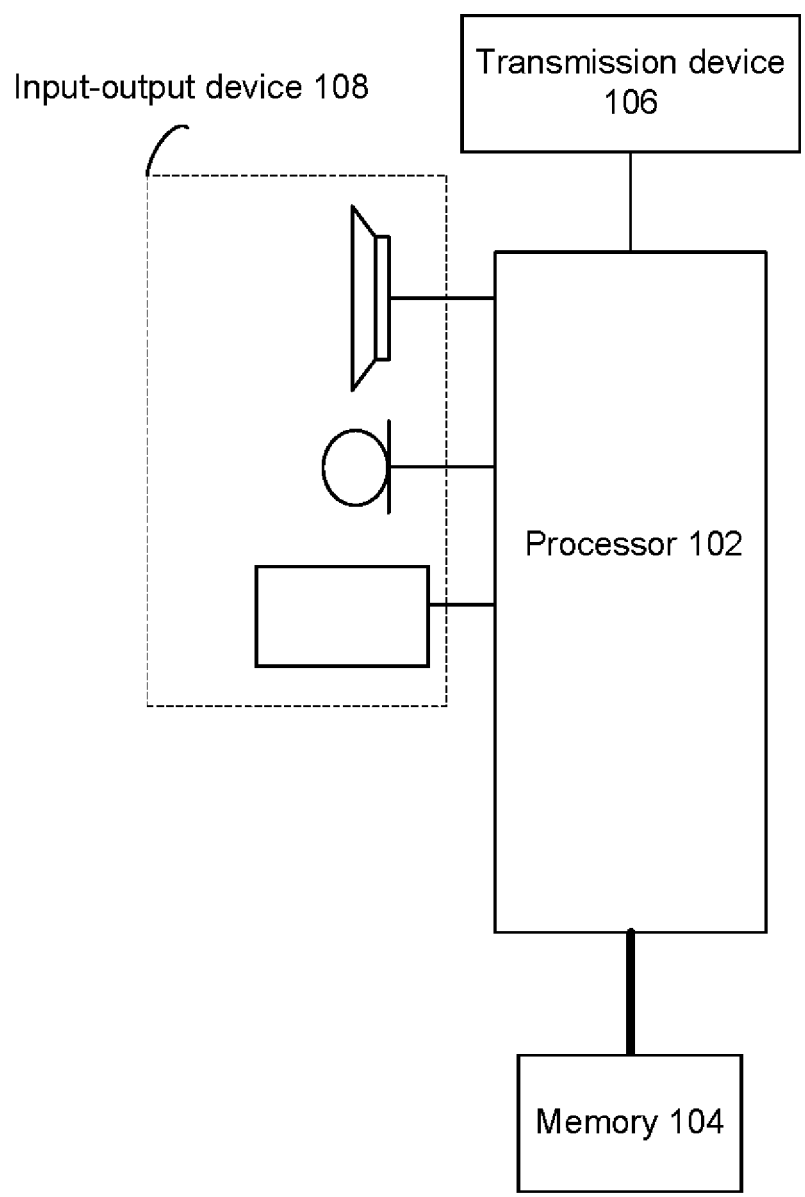
FIG. 1 is a structural block diagram of a hardware structure of a mobile terminal of an image processing method according to an embodiment of the present disclosure.

The method embodiment provided in Embodiment One of the present application may be performed in a mobile terminal, a computer terminal or a similar arithmetic device. Taking running on a mobile terminal as an example, FIG. 1 is a structural block diagram of a hardware structure of a mobile terminal of a three-dimensional scanning image acquisition method according to an embodiment of the present disclosure. As shown in FIG. 1, a mobile terminal 10 may include at least one (one is shown in FIG. 1) processor 102 (the at least one processor 102 may include, but is not limited to, a processing device such as a Microprogrammed Control Unit (MCU) or a Field Programmable Gate Array (FPGA)) and a memory 104 for storing data. Optionally, the above mobile terminal may further include a transmission device 106 with a communication function and an input-output device 108. Those of ordinary skill in the art can understand that the structure shown in FIG. 1 is schematic, and does not limit the structure of the above mobile terminal. For example, the mobile terminal 10 may further include components more or fewer than the components shown in FIG. 1, or have a different configuration from that shown in FIG. 1.

The memory 104 may be configured to store computer programs, including software programs and modules of application software, such as the computer programs corresponding to the three-dimensional scanning image acquisition method in the embodiments of the present disclosure. The processor 102 performs various functional applications and data processing by running the computer programs stored in the memory 104, thereby implementing the above method. The memory 104 may include a high-speed random access memory, and may also include a non-volatile memory, such as at least one magnetic storage device, flash memories, or other non-volatile solid state memories. In some examples, the memory 104 may further include memories remotely set with respect to the processor 102, and these remote memories may be connected with the mobile terminal 10 through a network. The examples of the above network include, but are not limited to, the Internet, the Intranet, local area networks, mobile communication networks, and combinations thereof.

The transmission device 106 is configured to receive or transmit data via a network. The specific example of the above network may include a wireless network provided by a communication supplier of the mobile terminal 10. In an example, the transmission device 106 includes a Network Interface Controller (NIC) which may be connected with other network devices through a base station to communicate with the Internet. In an example, the transmission device 106 may be a Radio Frequency (RF) module configured to communicate with the Internet in a wireless mode.

Figure 2:
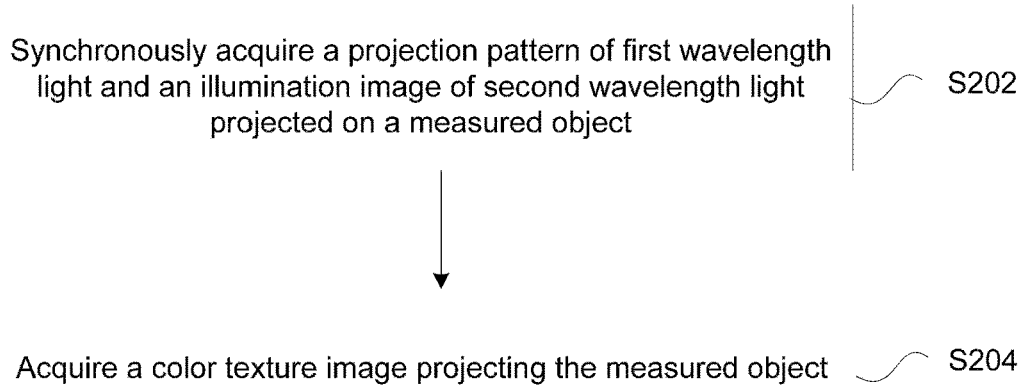
FIG. 2 is a flowchart of an image acquisition method according to an embodiment of the present disclosure.

In the present embodiment, an image acquisition method running in FIG. 1 is provided. FIG. 2 is a flowchart of a three-dimensional scanning image acquisition method according to an embodiment of the present disclosure. As shown in FIG. 2, the flow includes the following steps:

At step S202, a projection pattern of first wavelength light and an illumination image of second wavelength light projected on a measured object are synchronously acquired.

Optionally, synchronous acquisition refers to acquisition of the projection pattern and the illumination image at the same moment.

Optionally, the illumination image is an image for reflecting the texture of the measured object.

It should be noted that the illumination image in the present embodiment can reflect the texture of the projected object under the second wavelength light, but cannot reflect a true color of the projected object.

Optionally, the above-mentioned first wavelength light and second wavelength light are wavelength light not interfering with each other.

Specifically, the first wavelength light and the second wavelength light may be monochromatic light, for example, the first wavelength light is blue light, and the second wavelength light is red light. In addition, a mixed light is also within the scope of protection of the present embodiment, and at least it is ensured that the mixed light and another mid-wavelength light cannot interfere with each other, that is, it is within the scope of protection of the present embodiment.

Optionally, an operation of acquiring the projection pattern and the illumination image of the second wavelength light includes the following step. The acquired projection pattern and illumination image are distinguished by a first channel corresponding to the first wavelength light and a second channel corresponding to the second wavelength light.

For example, the first wavelength light is blue light, and the second wavelength light is red light. After the pattern of the first wavelength light and the second wavelength light are projected onto the measured object at the same time, a mixed image of the projection pattern of the first wavelength light and the illumination image of the second wavelength light is acquired. In order to distinguish these two images, the mixed image is respectively input into a color channel with a wavelength of 760 to 622 nm and a color channel with a wavelength of 450 to 435 nm. For the projection pattern, since the projection pattern is acquired by projecting the pattern of the first wavelength light onto the measured object, the projection pattern can be acquired after input to the color channel with the wavelength of 450 to 435 nm, and will be filtered out in the color channel with the wavelength of 760 to 622 nm. In a similar way, for the illumination image, since the illumination image is acquired by projecting the pattern of the second wavelength light onto the measured object, the illumination image can be acquired after input to the color channel with the wavelength of 760 to 622 nm, and will be filtered out in the color channel with the wavelength of 450 to 435 nm.

Optionally, an operation of synchronously acquiring the projection pattern and the illumination image projected on the measured object includes the following step. The projection pattern coincides with the illumination image in position. Or a position relationship between the projection pattern and the illumination image is determined according to a position relationship between a projection device of the projection pattern and a projection device of the illumination image.

Specifically, when the same collection device is used for collecting the projection pattern and the illumination image, the position relationship between the projection pattern and the illumination image is the same. However, when different collection devices are used for image collection, since the receiving angles between the collection devices are different, at this time, the position relationship between the projection pattern and the illumination image may be different. In this case, it is necessary to determine the position relationship between the two collection devices in advance, so as to determine the position relationship between the projection pattern and the illumination image.

Specifically, when the position relationship between the projection pattern and the illumination image is the same, it is necessary to distinguish the projection pattern and the illumination image by the first channel corresponding to the first wavelength light and the second channel corresponding to the second wavelength light.

At step S204, a color texture image projecting the measured object is acquired.

Optionally, the color texture image is acquired by triggering white light to be projected on the measured object.

It should be noted that a time point to trigger the performing of the step S204 is later than a time point to trigger the performing of the step S202.

Optionally, the projection pattern of the first wavelength light is used for performing three-dimensional reconstruction, and the illumination image of the second wavelength light is used for assisting texture tracking.

Embodiment Two

Figure 3:
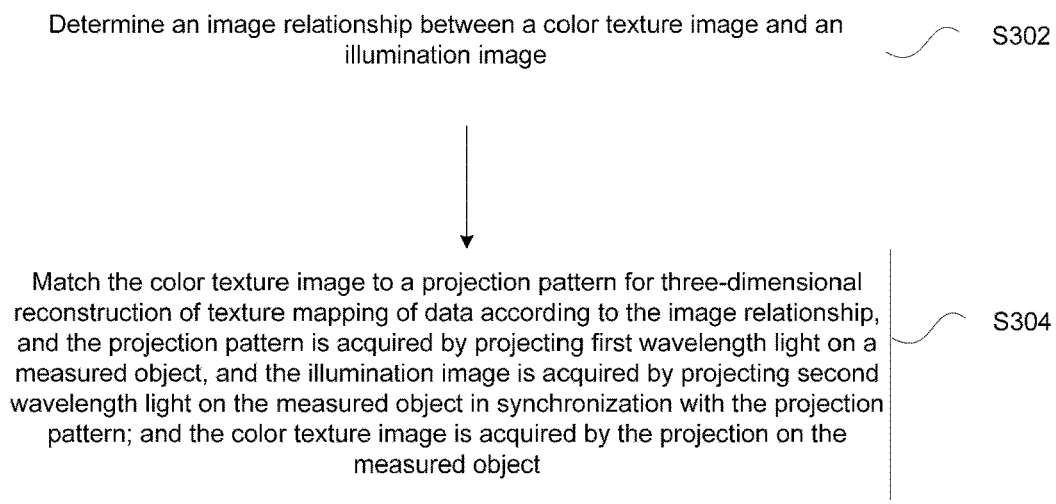
FIG. 3 is a flowchart of an image processing method according to an embodiment of the present disclosure.

FIG. 3 is a flowchart of a three-dimensional scanning image processing method according to an embodiment of the present disclosure. As shown in FIG. 3, the flow includes the following steps.

At step S302, an image relationship between a color texture image and an illumination image is determined.

Specifically, the projection pattern and the illumination image are acquired in the following manners: inputting the projected image to at least one color CCD chip; and receiving an image processed by the at least one color CCD chip.

Specifically, the color texture image is acquired in the following manners: inputting the projected color texture image to at least one color CCD chip; and receiving the color texture image processed by the at least one CCD chip.

Specifically, the image relationship between the color texture image and the illumination image is determined in at least one of the following manners: matching the color texture image with the illumination image by sift or surf feature extraction points, or processing an optical flow tracking algorithm on the color texture image and the illumination image.

Specifically, the image relationship at least includes: a conversion relationship between the color texture image and the illumination image, and a mapping relationship between the color texture image and the illumination image.

At step S304, the color texture image is matched to a projection pattern for three-dimensional reconstruction of texture mapping of data according to the image relationship.

In the present embodiment, the following scenarios are also provided to facilitate understanding the technical solutions of the above embodiments.

In a dental clinic, in order to understand the serious condition of the sick tooth of a patient, a dentist often uses a dynamic three-dimensional scanner to scan the tooth so as to observe the general view of the sick tooth of the patient.

Firstly, in order to acquire a three-dimensional reconstruction image of tooth, the pattern of the blue light and the red light are projected onto the sick tooth of the patient. In a shooting process, a blue channel and a red channel of a color camera can be used for respectively shooting a projection pattern corresponding to the blue light and a tooth image corresponding to the red light at the same time. Therefore, it can be ensured that the projection pattern corresponding to the blue light and the tooth image corresponding to the red light do not have any time difference or position difference.

Secondly, in order to acquire a color texture image of the tooth, the illumination optical system is used for performing projection on the sick tooth, and by means of shooting, the color texture image of the sick tooth can be acquired.

Then, since the tooth image corresponding to the red light and the color texture image of the tooth can both be used for reflecting features of the tooth, by means of a processing manner such as sift or surf feature point extraction matching or an optical flow tracking algorithm, the relationship between various parts of the tooth, such as the mapping relationship and conversion relationship between coordinates, angles and colors of a position of gum in the tooth image corresponding to the red light and the position of the gum in the color texture image of the tooth, can be acquired.

Finally, since the projection pattern corresponding to the blue light and the tooth image corresponding to the red light do not have any time difference or position difference, as long as the color texture image of the tooth is matched to the projection pattern corresponding to the blue light according to the corresponding relationship with the tooth image corresponding to the red light, the three-dimensional reconstruction image of the tooth can be matched with the color texture image of the tooth in time and position. And the problem of texture misalignment caused by the time difference and position difference between the three-dimensional reconstruction data and the color texture image can be solved.

It should be noted that the above examples are only enumerated, but not exhaustive. The application in the dental medicine field indicates one of the scenarios to be protected in the present embodiment, such as 3D printing, model building, building design and other fields.

Through the above steps, the problem of texture misalignment caused by the time difference and position difference between the three-dimensional reconstruction data and the color texture image in related art is solved, thereby achieving the effects of reduction of the time difference and position difference between the three-dimensional reconstruction data and the color texture image, high texture mapping accuracy, low production cost and less time waste.

Through the description of the above implementations, those skilled in the art can clearly understand that the method according to the above embodiment may be implemented by means of software plus a necessary general hardware platform, of course, hardware can also be used, but in many cases, the former is a preferred implementation. Based on such understanding, the technical solution of the present invention may be essentially, or the part which contributes to the existing technology, may be embodied in the form of a software product, and the computer software product is stored in a storage medium (such as a Read Only Memory (ROM)/Random Access Memory (RAM), a magnetic disk and an optical disk) and includes multiple instructions for causing one terminal device (which may be mobile phones, computers, servers or network devices, etc.) to perform the methods described in various embodiments of the present disclosure.

Embodiment Three

In the present embodiment, a three-dimensional scanning image acquisition apparatus is further provided. The device is configured to implement the above embodiments and preferred implementations, and those that have been described will not be repeated. As used below, the term "module" may implement a combination of software and/or hardware with preset functions. Although the devices described in the following embodiments are preferably implemented by software, implementation by hardware or a combination of software and hardware is also possible and conceived.

Figure 4:
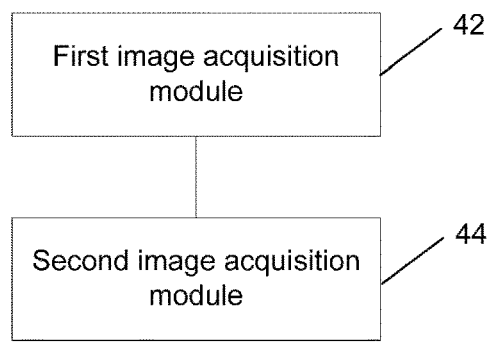
FIG. 4 is a structural block diagram of an image acquisition apparatus according to an embodiment of the present disclosure.

FIG. 4 is a structural block diagram of a three-dimensional scanning image acquisition apparatus according to an embodiment of the present disclosure. As shown in FIG. 4, the device includes:

a first image acquisition module 42, configured to synchronously acquire a projection pattern of first wavelength light and an illumination image of second wavelength light projected on a measured object; and a second image acquisition module 44, configured to acquire a color texture image projecting the measured object.

It should be noted that the above modules may be implemented by software or hardware. For the latter, it may be implemented in the following manners, but not limited to: the above modules are all located in the same processor, or the above modules are respectively located in different processors in any combination form.

Embodiment Four

In the present embodiment, a three-dimensional scanning image processing apparatus is further provided. The device is configured to implement the above embodiments and preferred implementations, and those that have been described will not be repeated. As used below, the term "module" may implement a combination of software and/or hardware with preset functions. Although the devices described in the following embodiments are optionally implemented by software, implementation by hardware or a combination of software and hardware is also possible and conceived.

Figure 5:
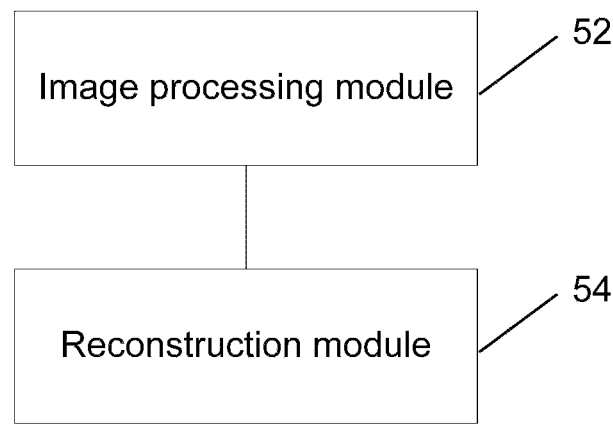
FIG. 5 is a structural block diagram of an image processing apparatus according to an embodiment of the present disclosure.

FIG. 5 is a structural block diagram of a three-dimensional scanning image processing apparatus according to an embodiment of the present disclosure. As shown in FIG. 5, the device includes:

an image processing module 52, configured to determine an image relationship between a color texture image and an illumination image; and a reconstruction module 54, configured to match the color texture image to a projection pattern for three-dimensional reconstruction of texture mapping of data according to the image relationship.

The projection pattern is acquired by projecting first wavelength light on a measured object, and the illumination image is acquired by projecting second wavelength light on the measured object in synchronization with the projection pattern. And the color texture image is acquired by the projection on the measured object.

Embodiment Five

In the present embodiment, a three-dimensional scanning device is further provided. The three-dimensional scanning device is configured to implement the above embodiments and preferred implementations, and those that have been described will not be repeated.

Figure 6:
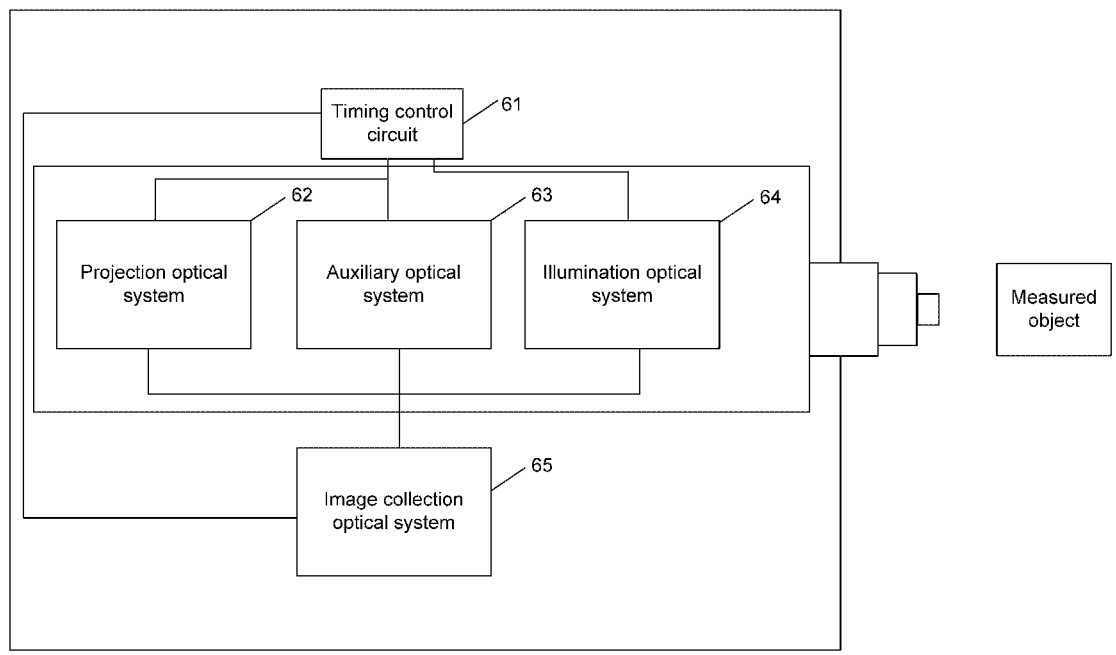
FIG. 6 is a structural block diagram of a three-dimensional scanning device according to a first embodiment of the present disclosure.

FIG. 6 is a structural block diagram of a three-dimensional scanning device according to a first embodiment of the present disclosure. As shown in FIG. 6, the three-dimensional scanning device includes:

a timing control circuit 61, a projection optical system 62, an auxiliary optical system 63, an illumination optical system 64 and an image collection optical system 65.

Each of the projection optical system, the auxiliary optical system and the illumination optical system includes a projection device configured to project light. The image collection optical system 65 is configured to collect images projected to a measured object by the projection optical system 62, the auxiliary optical system 63 and the illumination optical system 64.

The timing control circuit 61 is connected with the image collection optical system 65, the projection optical system 62, the auxiliary optical system 63 and the illumination optical system 64, and is configured to perform timing control on the image collection optical system 65, the projection optical system 62, the auxiliary optical system 63 and the illumination optical system 64.

Optionally, when the timing control circuit 61 determines that a first moment is reached, the projection optical system 62 is triggered to project a pattern of first wavelength light onto a measured object, the auxiliary optical system 63 is triggered to project second wavelength light onto the measured object, and a projection pattern of the first wavelength light and an illumination image of the second wavelength light are acquired by the image collection optical system 65. When the timing control circuit 61 determines that a second moment is reached, the illumination optical system 64 is triggered to project white light on the measured object, and a color texture image is acquired by the image collection optical system 65.

Optionally, the auxiliary optical system 63 and the illumination optical system 64 are the same optical system, that is, include the same projection device, and the second wavelength light and the white light are projected by the same projection device.

Figure 7:
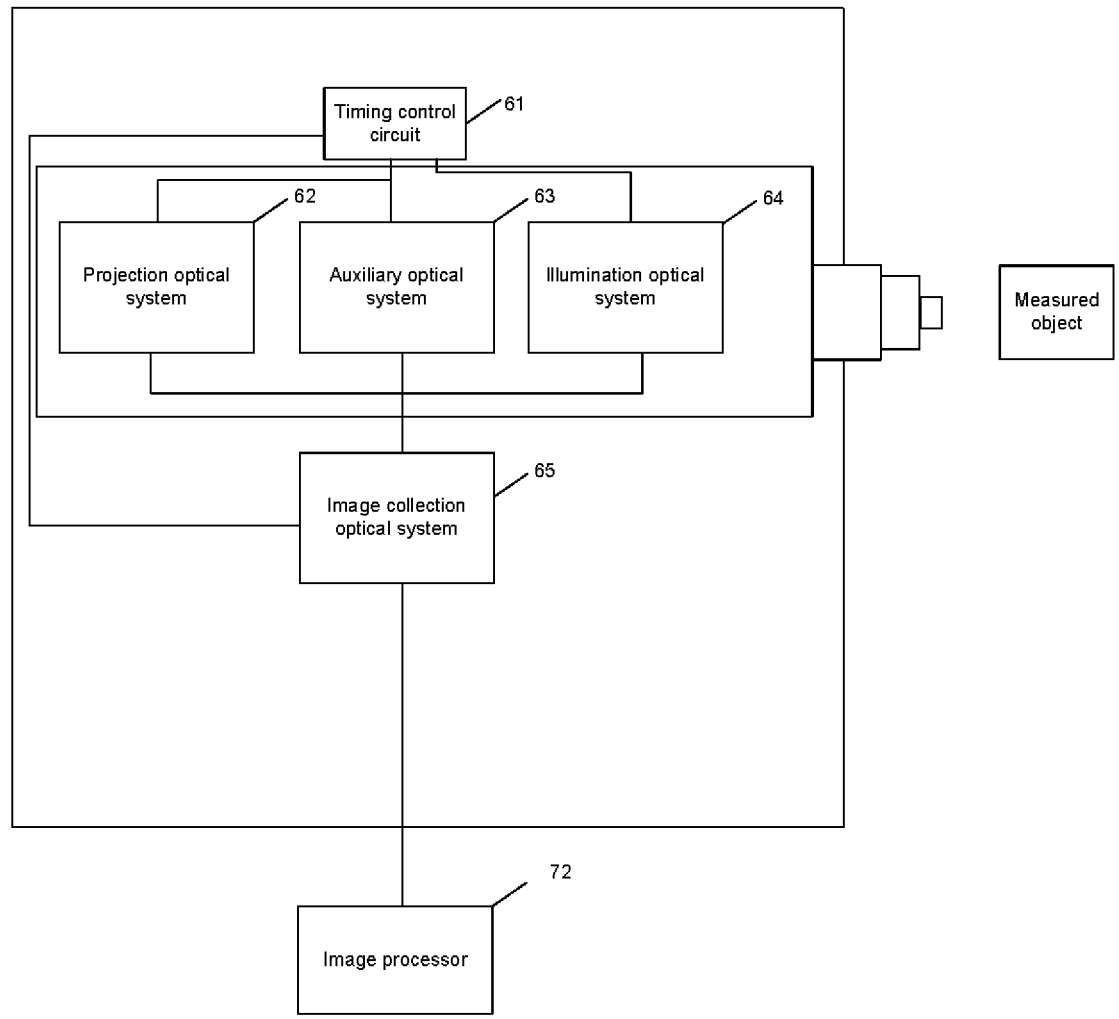
FIG. 7 is a structural block diagram of a three-dimensional scanning device according to a second embodiment of the present disclosure.

Optionally, on the basis of the three-dimensional scanning device in FIG. 6, FIG. 7 is a structural block diagram of a three-dimensional scanning device according to a second embodiment of the present disclosure. As shown in FIG. 7, the three-dimensional scanning device is connected with an image processor 72, and the image processor 72 collects the projection pattern, the illumination image and the color texture image; determines an image relationship between the color texture image and the illumination image; and matches the color texture image to the projection pattern for three-dimensional reconstruction of texture mapping of data according to the image relationship.

Figure 8:
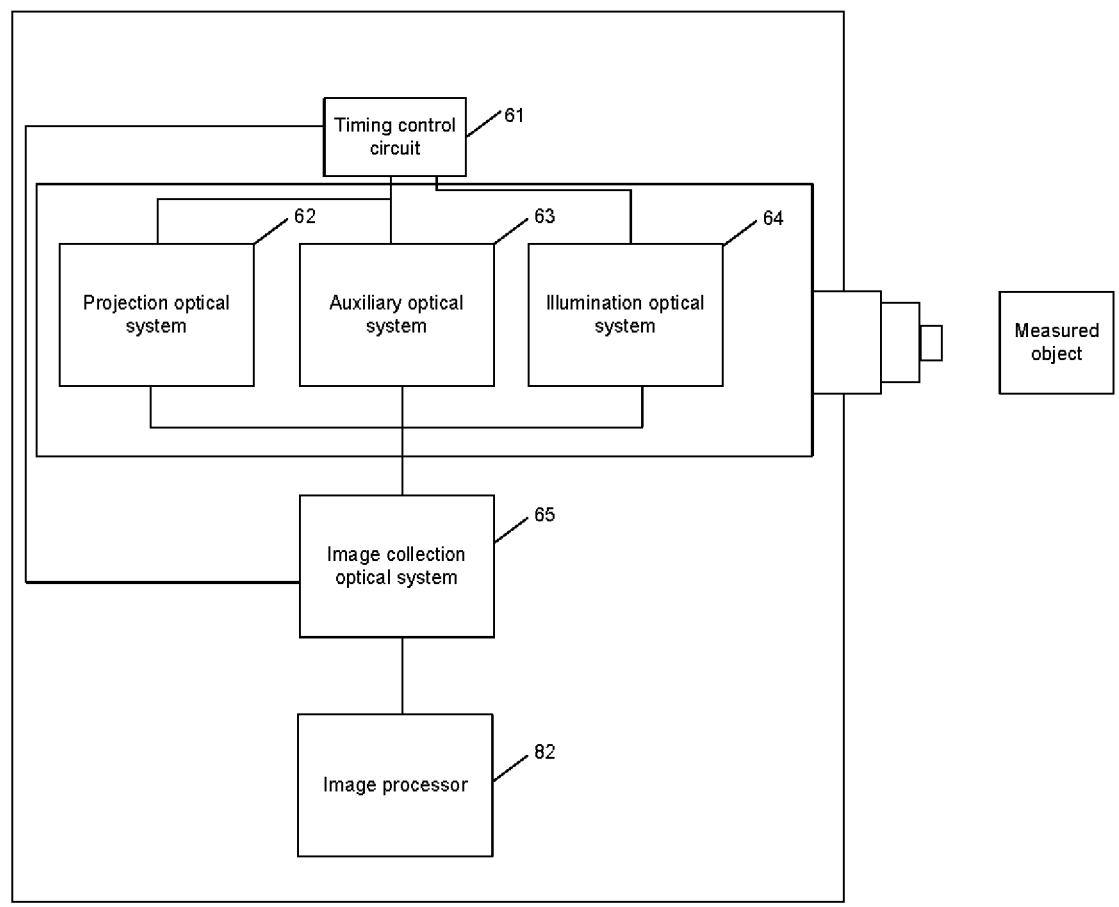
FIG. 8 is a structural block diagram of a three-dimensional scanning device according to a third embodiment of the present disclosure.

Optionally, on the basis of the three-dimensional scanning device in FIG. 6, FIG. 8 is a structural block diagram of still a three-dimensional scanning device according to a third embodiment of the present disclosure. As shown in FIG. 8, the three-dimensional scanning device includes an image processor 82, and the image processor 82 collects the projection pattern, the illumination image and the color texture image; determine an image relationship between the color texture image and the illumination image, and matches the color texture image to the projection pattern for three-dimensional reconstruction of texture mapping of data according to the image relationship.

Figure 9:
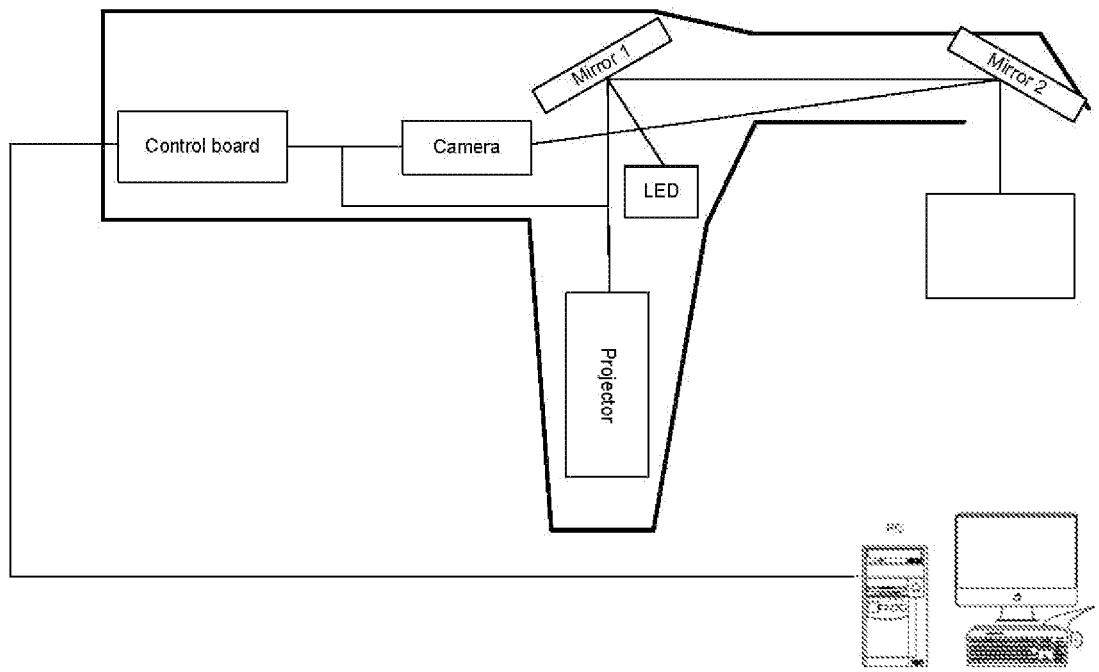
FIG. 9 is a structural schematic diagram of a three-dimensional scanning device according to an embodiment of the present disclosure.

FIG. 9 is a structural schematic diagram of a three-dimensional scanning device according to an embodiment of the present disclosure. As shown in FIG. 9, a Projector optical path shown in FIG. 9 is the projection optical system 62, and an LED is set as the auxiliary optical system 63 for providing the second wavelength light and the illumination optical system 64 for providing the white light. The Camera is configured to perform the operation of the image collection optical system 65. Meanwhile, a control board is configured to perform a timing control function of the timing control circuit 61. Finally, the image processor 72 or the image processor 82 may be implemented by a Personal Computer (PC) terminal shown in FIG. 9. In addition, FIG. 9 also provides multiple plane mirrors configured to project or emit the emitted light in the LED and the projector optical path onto the measured object. Specifically, the LED is a three-color light source or a light source of three different wavelengths.

In addition, it should be noted that FIG. 9 is an exemplary structural schematic diagram of a three-dimensional scanning device, and other structural schematic diagrams based on the idea of the present embodiment are also within the scope of protection of the present embodiment. For example, in order to prevent interference, multiple plane mirrors and other optical devices at different positions may be arranged to filter the emitted light through reflection and transmission.

Optionally, the projection device of at least one of the projection optical system 62, the auxiliary optical system 63 and the illumination optical system 64 is a digital micromirror device. The digital micromirror device includes a projection module using a Digital Light Processing (DLP) technology. One of the implementations is that the Projector optical path shown in FIG. 9 is a digital micromirror device, and the LED may also be replaced by a digital micromirror device.

Figure 10:
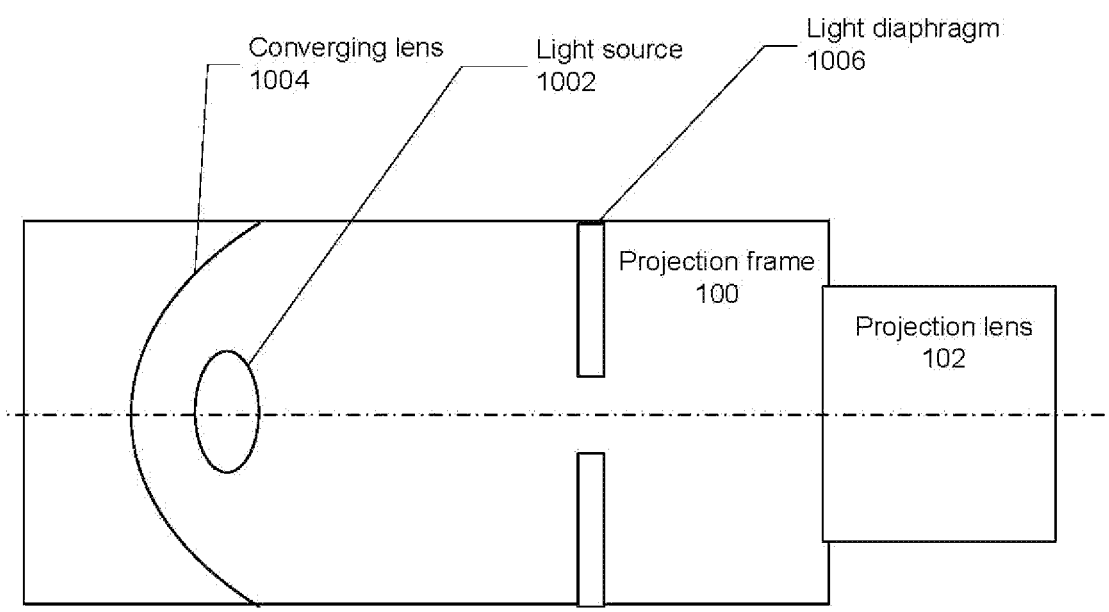
FIG. 10 is a structural schematic diagram of a projection device according to an embodiment of the present disclosure.

FIG. 10 is a structural schematic diagram of a projection device according to an embodiment of the present disclosure. FIG. 10 includes a projection frame 100 and a projection lens 102 connected with the projection frame 100. The projection frame 100 includes:

a light source 1002, located at one end in the projection frame 100 away from the projection lens;

a converging lens 1004, located at one end in the projection frame 100 away from the projection lens, and configured to converge light from the light source 1002; and a light diaphragm 1006, located in the projection frame 100 and arranged between the light source 1002 and the projection lens 102. Specifically, the light diaphragm 1006 includes an upper sub-light diaphragm and a lower sub-light diaphragm which are connected with a body of the projection frame 100.

The light source 1002 and the projection lens 102 are coaxially arranged.

Figure 11:
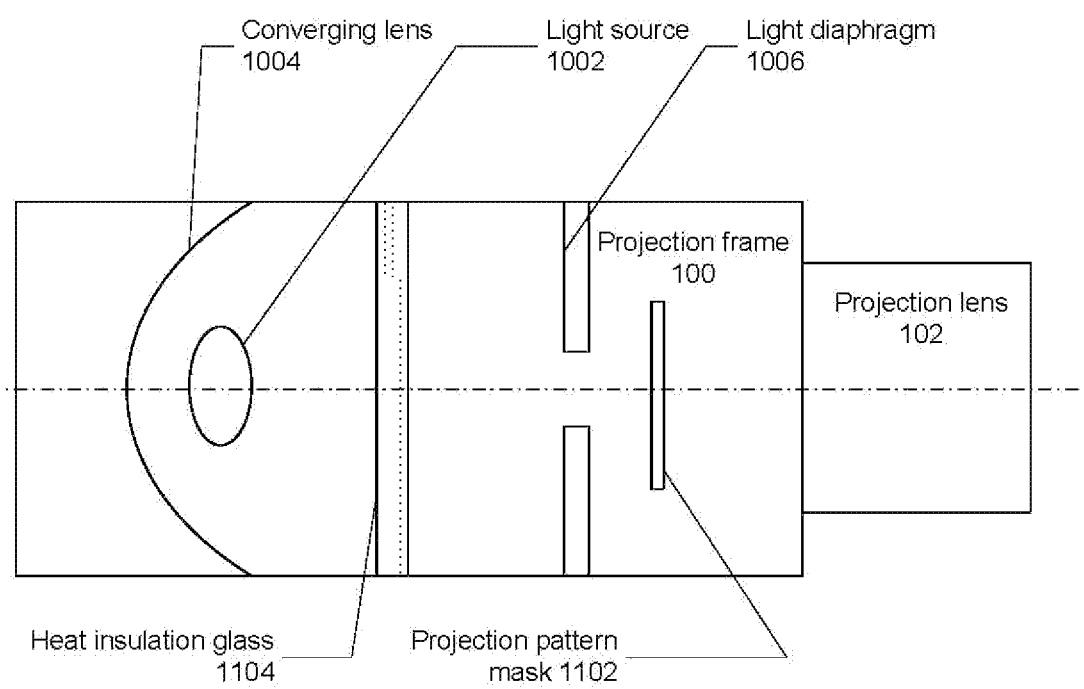
FIG. 11 is a structural schematic diagram of a projection device according to another embodiment of the present disclosure.

FIG. 11 is a structural schematic diagram of a projection device according to another embodiment of the present disclosure. As shown in FIG. 11, on the basis of including the structure in FIG. 10, in the projection optical system, the auxiliary optical system and the illumination optical system, the projection device of the projection optical system is provided with a projection pattern mask 1102. In an embodiment, the projection device in the projection optical system is provided with a projection pattern mask 1102, and the projection device in each of the auxiliary optical system and the illumination optical system is not provided with a projection pattern mask 1102. In another embodiment, the projection device in the auxiliary optical system is provided with a projection pattern mask 1102, and the projection pattern mask 1102 has simple patterns, such as cross lines, which do not affect texture tracking and can quickly and accurately acquire the conversion relationship between the illumination image and the color texture image, thereby improving the texture mapping efficiency and accuracy.

The projection pattern mask 1102 is located at the light diaphragm 1006 and the projection lens 102, that is, the template of the pattern to be projected.

Optionally, the projection device further includes: heat insulation glass 1104, located between the light source 1002 and the light diaphragm 1006, and configured to prevent heat generated by the light source 1002 from diffusing to the projection pattern and the projection lens 102, so as to prolong a service life of the projection device.

Embodiment Six

The embodiment of the present disclosure further provides a storage medium. A computer program is stored in the storage medium, and the computer program is configured to perform steps in any one of the above method embodiments when running.

Optionally, in the present embodiment, the above storage medium may be configured to store a computer program for performing the following steps.

At step S1, a projection pattern of first wavelength light and an illumination image of second wavelength light projected on a measured object are synchronously acquired.

At step S2, a color texture image projecting the measured object is acquired.

At step S3, an image relationship between the color texture image and the illumination image is determined.

At step S4, the color texture image is matched to the projection pattern for three-dimensional reconstruction according to the image relationship.

Optionally, in the present embodiment, the above storage medium may include, but is not limited to: various media capable of storing computer programs, such as a U disk, a ROM, a RAM, a mobile hard disk, a magnetic disk and an optical disk.

Embodiment Seven

The embodiment of the present disclosure further provides an electronic apparatus, including a memory and a processor. A computer program is stored in the memory, and the processor is configured to run the computer program to perform steps in any one of the above method embodiments.

Optionally, the above electronic device may further include a transmission device and an input-output device. The transmission device is connected with the above processor, and the input-output device is connected with the above processor.

Optionally, in the present embodiment, the above processor may be configured to perform the following steps through a computer program:

At step S1, a projection pattern of first wavelength light and an illumination image of second wavelength light projected on a measured object are synchronously acquired.

At step S2, a color texture image projecting the measured object is acquired.

At step S3, an image relationship between the color texture image and the illumination image is determined.

At step S4, the color texture image is matched to the projection pattern for three-dimensional reconstruction according to the image relationship.

Optionally, for specific examples in the present embodiment, reference may be made to the examples described in the above embodiments and optional implementations, and they will not be repeated here in the present embodiment.

Obviously, those skilled in the art should understand that the above modules or steps of the present disclosure can be implemented by a general computing device. They can be concentrated on a single computing device, or distributed on a network consisting of multiple computing devices. Optionally, they can be implemented by program codes capable of being executed by the computing device, so that they can be stored in a storage device and executed by the computing device. Furthermore, in some cases, the shown or described steps can be performed in a sequence different from the sequence here, or they can be made into individual integrated circuit modules respectively, or multiple modules or steps of them can be made into a single integrated circuit module to achieve. In this way, the present disclosure is not limited to any specific combination of hardware and software.

The above embodiments are exemplary embodiments of the present disclosure and are not intended to limit the present disclosure, and various modifications and changes can be made in the present disclosure for those skilled in the art. Any modification, equivalent replacement and improvement made within the principle of the present disclosure are intended to be included within the scope of protection of the present disclosure.

What is claimed is:

1. A three-dimensional scanning image acquisition method, comprising:
    synchronously acquiring a projection pattern of first wavelength light and an illumination image of second wavelength light projected on a measured object at a first moment; and
    acquiring a color texture image projecting the measured object at a second moment, wherein the first moment is different from the second moment;
    wherein the projection pattern of first wavelength light is used for performing three-dimensional reconstruction, and the illumination image of second wavelength light is used for assisting the color texture image in texture tracking;
    the color texture image is acquired by triggering white light to be projected on the measured object, the illumination image is an image for reflecting the texture of the measured object, the illumination image is not configured to reflect a true color of the measured object.

2. The method as claimed in claim 1, wherein synchronously acquiring the projection pattern and the illumination image projected on the measured object comprises:
    the projection pattern coincides with the illumination image in position; or
    a position relationship between the projection pattern and the illumination image is determined according to a position relationship between a collection device of the projection pattern and a collection device of the illumination image.

3. The method as claimed in claim 1, wherein the first wavelength light and the second wavelength light are wavelength light not interfering with each other in wavelength.

4. A three-dimensional scanning image processing method, comprising:
    determining an image relationship between a color texture image and an illumination image; and
    matching the color texture image to a projection pattern for three-dimensional reconstruction of texture mapping of data according to the image relationship;
    wherein the projection pattern is acquired by projecting first wavelength light on a measured object at a first moment, and the illumination image is acquired by projecting second wavelength light on the measured object in synchronization with the projection pattern; and the color texture image is acquired by the projection on the measured object at a second moment, wherein the first moment is different from the second moment;
    wherein the projection pattern of first wavelength light is used for performing three-dimensional reconstruction, and the illumination image of second wavelength light is used for assisting the color texture image in texture tracking;
    the color texture image is acquired by triggering white light to be projected on the measured object, the illumination image is an image for reflecting the texture of the measured object, the illumination image is not configured to reflect a true color of the measured object.

5. The method as claimed in claim 4, wherein the image relationship between the color texture image and the illumination image is determined in at least one of the following manners:
    matching the color texture image with the illumination image by sift or surf feature extraction points, or processing an optical flow tracking algorithm on the color texture image and the illumination image.

6. The method as claimed in claim 4, wherein the image relationship comprises at least one of: a conversion relationship between the color texture image and the illumination image, and a mapping relationship between the color texture image and the illumination image.

7. The method as claimed in claim 4, wherein the projection pattern, the illumination image and the color texture image are acquired in the following manners:
    inputting the projected image to at least one color Charge Coupled Device, CCD, chip; and
    receiving an image processed by the at least one color CCD chip.

8. A non-transitory storage medium, wherein a computer program is stored in the storage medium, and the computer program is configured to perform the method as claimed in claim 1 when running.

9. An electronic device, comprising a memory and a processor, wherein a computer program is stored in the memory, and the processor is configured to run the computer program to perform the method as claimed in claim 1.

* * * * *